United States Patent

Blohowiak et al.

Patent Number: 6,086,664
Date of Patent: *Jul. 11, 2000

[54] EFFICIENT, ENVIRONMENTALLY ACCEPTABLE METHOD FOR WATERPROOFING INSULATION MATERIAL

[75] Inventors: Kay Y. Blohowiak, Issaquah; Kenneth A. Krienke; Larry K. Olli, both of Seattle; Charles W. Newquist, Issaquah, all of Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 09/076,785

[22] Filed: May 12, 1998

Related U.S. Application Data

[60] Provisional application No. 60/046,235, May 12, 1997.

[51] Int. Cl.⁷ .................. C09D 4/00; B32B 2/04
[52] U.S. Cl. ............... 106/287.16; 106/2; 106/287.14; 427/387; 427/373.6
[58] Field of Search .............. 106/2, 287.16, 106/287.14; 427/393.6, 387

[56] References Cited

U.S. PATENT DOCUMENTS

| | | | |
|---|---|---|---|
| Re. 33,759 | 12/1991 | DePasquale et al. | 106/2 |
| 3,772,065 | 11/1973 | Seiler | 106/2 |
| 4,835,014 | 5/1989 | Roth et al. | 427/387 |

(List continued on next page.)

*Primary Examiner*—C. Melissa Koslow
*Attorney, Agent, or Firm*—Paul C. Cullom

[57] ABSTRACT

A process of waterproofing alumina-rich or silica-rich fibrous thermal insulation material, the process including the steps of:
(a) providing an alumina-rich or a silica-rich fibrous material;
(b) providing a waterproofing solution including:
  (1) a carrier solvent selected from the group consisting of aliphatic alcohols having from 1C to 6C, water, and mixtures thereof; and
  (2) an alkoxysilane defined by the formula $R_{4-x}$-Si-(O-R')$_x$ where x is 1–3 and R is selected from the group consisting of alkyl groups having from 1C to 10C, hydrogen, or fluorocarbon groups having from 1F to 15F; and where O-R' is an alkoxy group having from 1C to 5C, or a mixture of alkoxysilanes defined by the above formula $R_{4-x}$-Si-(O-R')$_x$; and optionally
  (3) modifiers including acids, such as acetic acid or nitric acid, or bases, such as ammonium hydroxide, $RNH_2$, $R_2NH$, or $R_3N$, or MOH, where R is selected from the group consisting of alkyl groups having from 1C to 10C or hydrogen, and where M=Na, Li, or K;
(c) contacting the fibrous material with the waterproofing solution for a sufficient amount of time to waterproof the fibrous material; and
(d) curing the coated fibrous material to render it sufficiently waterproof.

A chemical solution for waterproofing alumina-rich or silica-rich fibrous thermal insulation materials, the solution including:
(a) a carrier solvent selected from the group consisting of aliphatic alcohols having from 1C to 6C, water, and mixtures thereof; and
(b) an alkoxysilane defined by the formula $R_{4-x}$-Si-(O-R')$_x$ where x is 1–3 and R is selected from the group consisting of alkyl groups having from 1C to 10C, hydrogen, or fluorocarbon groups having from 1F to 15F; and where O-R' is an alkoxy group having from 1C to 5C, or a mixture of alkoxysilanes defined by the above formula $R_{4-x}$-Si-(O-R')$_x$; and optionally
(c) modifiers including acids, such as acetic acid or nitric acid, or bases, such as ammonium hydroxide, $RNH_2$, $R_2NH$, or $R_3N$, or MOH, where R is selected from the group consisting of alkyl groups having from 1C to 10C or hydrogen, and where M=Na, Li, or K.

11 Claims, 1 Drawing Sheet

U.S. PATENT DOCUMENTS

| | | | |
|---|---|---|---|
| 4,990,377 | 2/1991 | Wilson | 106/2 |
| 5,205,860 | 4/1993 | Narula et al. | 106/2 |
| 5,209,775 | 5/1993 | Bank et al. | 106/2 |
| 5,393,330 | 2/1995 | Chen et al. | 106/2 |
| 5,449,712 | 9/1995 | Gierke et al. | 524/266 |
| 5,654,060 | 8/1997 | Holman et al. | 428/68 |
| 5,766,322 | 6/1998 | Leiser et al. | 106/2 |

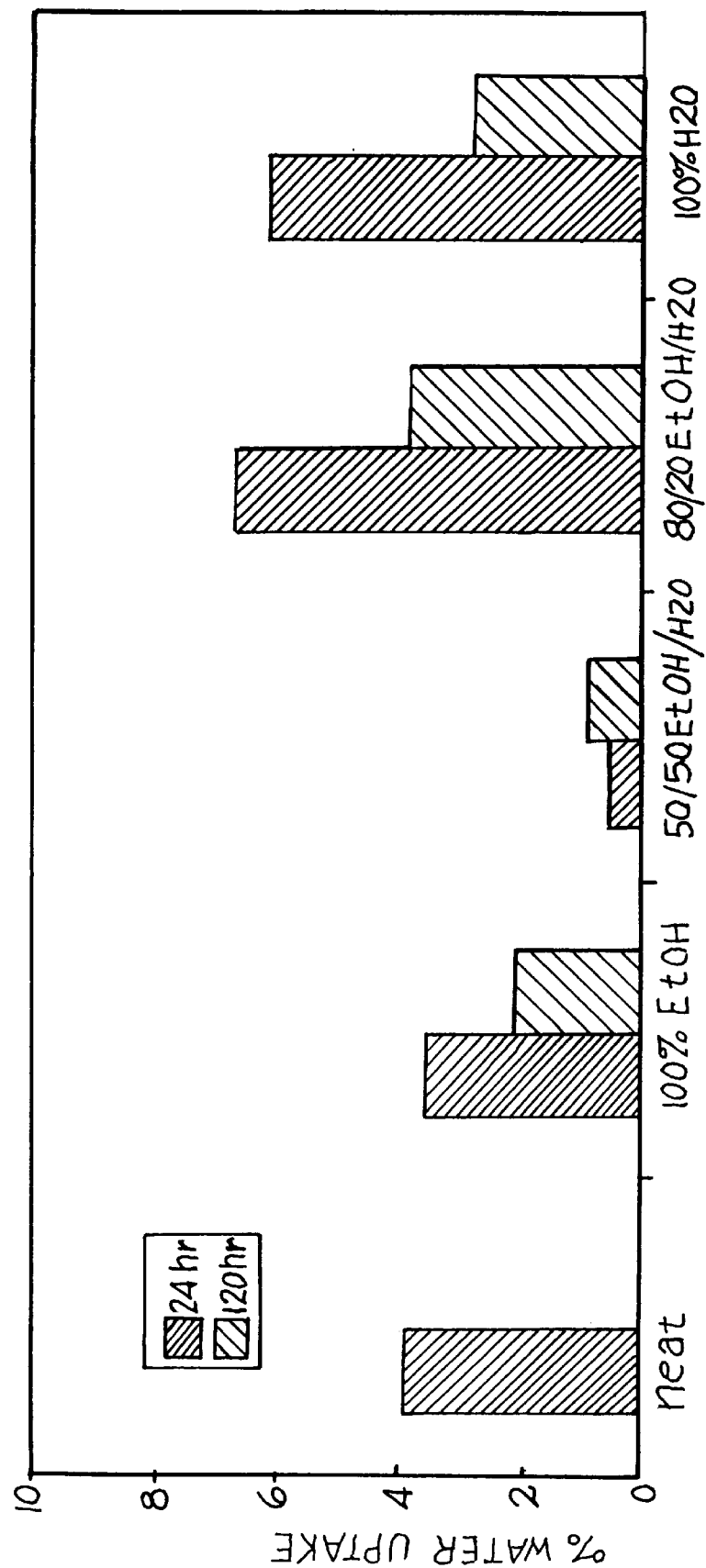

EFFICIENT, ENVIRONMENTALLY ACCEPTABLE METHOD FOR WATERPROOFING INSULATION MATERIAL

CROSS-REFERENCE TO RELATED APPLICATIONS

This application claims the benefit of U.S. provisional application No. 60/046,235 filed on May 12, 1997.

STATEMENT AS TO INVENTION MADE UNDER FEDERALLY SPONSORED RESEARCH AND DEVELOPMENT

This invention was made with U. S. Government support under Cooperative Agreement No. NCC8-77 awarded by the National Aeronautics and Space Administration (NASA).

FIELD OF THE INVENTION

The invention is in the field of processes and chemical solutions for waterproofing alumina-rich and silica-rich fibrous materials, for example, alumina-rich and silica-rich fibrous insulation materials useful for aerospace applications.

BACKGROUND OF THE INVENTION

In their native state, alumina-rich and silica-rich ceramic fiber materials are hydrophilic, adsorbing water onto their surface and permitting the interstices between fibers in a ceramic fiber insulation material to fill with water. If untreated, fibrous insulation materials can gain up to 600% of their weight in water. The ramifications of this hydrophilicity are significant. Reusable space vehicles are covered on the outside with fibrous ceramic insulation materials for protection from the heat of reentering the Earth's atmosphere. Unless this insulation is treated to repel water it can become saturated due to rain exposure or condensation and add enough weight to compromise the mission of weight-critical launch vehicles. In commercial airplane operations, internal fibrous ceramic insulation absorbs moisture by condensation, causing problems ranging from water dripping from the insulation onto the passengers in the passenger cabin (the "rain-in-the-plane" problem), weight uptake, and corrosion caused by long-term water exposure and contact with wet insulation on the interior of aluminum-based airplane structures.

Effective waterproofing and re-waterproofing of the Thermal Protection System (TPS), located on the exterior of reusable launch vehicles such as the NASA Space Shuttle Orbiter, is critical to maintaining the integrity of the TPS. Our improved waterproofing and re-waterproofing of the TPS will minimize the time required to effectively waterproof the TPS. Conventional waterproofing processes can be time-consuming, costly, and often involve labor-intensive manual injection of high concentrations of toxic materials into the insulation. The Space Shuttle Orbiter TPS requires waterproofing and approximately 43% of that area requires re-waterproofing before the next space flight. Conventional waterproofing processes can also contaminate other systems on the vehicle with the waterproofing agent.

We have shown the feasibility of using dilute waterproofing agent formulations having an alcohol/water carrier system that can decrease application times by 50X, that minimizes compatibility and contamination issues, and that is safe and environmentally compliant. Our new spray-on dilute carrier process uses 50X less waterproofing agent and costs about 30X less than the conventional process. Feasibility research shows the system to be generally effective for different TPS materials. Similar improvements are expected on other vehicles and other blanket and tile-based insulation systems.

SUMMARY OF THE INVENTION

In one aspect, the invention is a process of waterproofing alumina-rich or silica-rich fibrous thermal insulation material, the process including the steps of:

(a) providing an alumina-rich or a silica-rich fibrous thermal insulation material;

(b) providing a waterproofing solution including:

(1) a carrier solvent selected from the group consisting of aliphatic alcohols having from 1C to 6C, water, and mixtures thereof;

(2) an alkoxysilane defined by the formula $R_{4-x}$-Si-(O-R')$_x$ were x is 1–3 and R is selected from the group consisting of alkyl groups having from 1C to 10C, hydrogen, and fluorocarbon groups having from 1F to 15F; and where O-R' is an alkoxy group having from 1C to 5C, or a mixture of alkoxysilanes defined by the formula $R_{4-x}$-Si-(O-R')$_x$; and optionally (3) modifiers, including acids, such as acetic acid or nitric acid, or bases, such as ammonium hydroxide, $RNH_2$, $R_2NH$, or $R_3N$, or MOH, where R is selected from the group consisting of alkyl groups having from 1C to 10C or hydrogen, and where M is selected from the group consisting of Na, Li, or K;

(c) contacting the fibrous material with the waterproofing solution for a sufficient amount of time to waterproof the fibrous material; and (d) curing the coated fibrous material to render it sufficiently waterproof.

In another aspect, the invention is a chemical solution for waterproofing alumina-rich or silica-rich fibrous thermal insulation materials, the solution including:

(a) a carrier solvent selected from the group consisting of aliphatic alcohols having from 1C to 6C, water, and mixtures thereof;

(b) an alkoxysilane defined by the formula $R_{4-x}$-Si-(O-R')$_x$ where x is 1–3 and R is selected from the group consisting or alkyl groups having from 1C to 10C, hydrogen, and fluorocarbon groups having from 1F to 15F; and where O-R' is an alkoxy group having from 1C to 5C, or a mixture of alkoxysilanes defined by the formula $R_{4-x}$-Si-(O-R')$_x$, and optionally (d) modifiers, including acids, such as acetic acid or nitric acid, or bases, such as ammonium hydroxide, $RNH_2$, $R_2NH$, or $R_3N$, or MOH, where R is selected from the group consisting of alkyl groups having from 1C to 10C or hydrogen, and where M=Na, Li, or K.

BRIEF DESCRIPTION OF THE DRAWING

The drawing illustrates the results of waterproofing tests using dimethyldiethoxysilane (DMDES) in five different carrier solutions. More specifically, the drawing depicts the water uptake (wt. %) results in a NEXTEL 440/SAFFIL flexible blanket Thermal Protection System (TPS) for two time periods: for 24 hours after injection of the waterproofing solution and for 120 hours after injection of the waterproofing solution. The five different carrier (solvent) solutions shown in the drawing are as follows: (1) neat (undiluted) DMDES; (2) 2% by volume of DMDES and 98% by vol. of an ethanol (EtOH) carrier solution; (3) 2% by volume of DMDES and 98% by volume of a 50/50 (by volume) ethanol/water (EtOH/H$_2$O) carrier solution; (4) 2% by volume of DMDES and 98% by volume of an 80/20 (by volume) ethanol/water carrier solution; and (5) 2% by volume of DMDES and 98% by volume of a 100% water (H$_2$O) carrier solution.

DETAILED DESCRIPTION OF THE INVENTION

This invention is a series of chemical waterproofing solutions and processes to waterproof insulation materials. The specific choice of formulation and process will depend upon the particular application. Specific examples of the invention are described below.

Many different functionalized organosilanes are commercially available from several sources. We prefer an alkoxysilane defined by the formula R$_{4-x}$-Si-(O-R')$_x$ where x is 1–3 and R is selected from the group consisting of alkyl groups having from 1C to 10C, hydrogen, and fluorocarbon groups having from 1F to 15F; and where O-R' is an alkoxy group having from 1C to 5C, or a mixture of alkoxysilanes defined by the formula R$_{4-x}$-Si-(O-R')$_x$. For the purposes of hydrophobicity in this invention, the functional groups on the silane typically consist of hydrocarbons or fluorinated hydrocarbons. Short chain hydrocarbons, exemplified by the methyl group, are preferred over the longer chain because of weight and thermal stability.

The non-fluorinated waterproofing agents are generally preferred over the fluorinated for space vehicle applications because of the additional weight factor and clean burning off of the agent's coating upon reentry. For commercial airplanes, the fluorinated agents provide a more durable coating that is more resistant to contamination from surfactant agents and corrosion-inhibiting agents present on the interior of the vehicle. Mono- and dialkyl species usually impart enough hydrophobicity while still maintaining the appropriate sol-gel reactivity and allow the use of water and ethanol as waterproofing solution carriers (solvents).

Alkoxysilanes were chosen because of their ability to hydrolyze and condense onto the oxide surface. The alkoxide functionality affects the reactivity of the waterproofing agent. Mono-alkoxides, such as dimethylethoxysilane (DMES), were found to condense slowly with the alumina surface. Di-alkoxide species tended to have a more rapid rate of hydrolysis, condensation, and reaction to the oxide surface, making them compatible with a large waterproofing operation. In a water-based or water-containing system, the dialkoxide systems provide a more suitable formulation for waterproofing of insulation materials. Some cross-linking occurs during the hydrolyzation process and results in an effective coating on the insulation surface. Additionally, these materials afforded greater ranges in operability, which changes from vehicle to vehicle.

The type of alkoxide on the silane molecule can influence the rate and type of reaction via steric and electronic modification of the silicon center. Methoxides and ethoxides tended to yield the appropriate reactivity, whereas isopropoxides and butoxides tend to become too sterically hindered. Ethoxides are preferred over methoxides because the alcohol by-product created during the hydrolysis process, ethanol versus methanol, is less hazardous.

Modifiers may optionally be added to the waterproofing solutions to affect the rates of hydrolysis versus condensation. The modifiers may be acids, such as acetic acid or nitric acid, or bases, such as ammonium hydroxide, RNH$_2$, R$_2$NH, or R$_3$N, or MOH, where R is selected from the group consisting of alkyl groups having from 1C to 10C or hydrogen, and where M is selected from the group consisting of Na, Li, or K. The exact formulation that is chosen depends on the insulation material substrate and the operability and performance requirements of the vehicle.

The relative rates of the hydrolysis and condensation reactions that make up the sol-gel process are controlled by the type of modifier (i.e., acid or base), the concentration of the reagents in the solution, the metal alkoxide, and the water available for hydrolysis. An acid modifier promotes the hydrolysis reaction over condensation, while a base modifier does the opposite.

Many other factors, such as solution age, pH, concentration, and formulation, affect the modifier efficiency, and under some conditions, modifiers may not be necessary to promote the reaction. However, they can expedite the hydrolysis and condensation of the metal alkoxides. Our initial investigations showed a slight increase in waterproofing efficiency at shorter reactions times resulting from the addition of acetic acid to a 2% DMDES 50/50 H$_2$O/EtOH solution aged for 24 hours. This plays a more important role when discussing various substrates and scenarios where a very fast turnaround time is required to achieve waterproofing.

For commercial airplanes, the requirements are much different than for space vehicles in that the waterproofing is only applied to the insulation material one time, contamination by surfactants and corrosion inhibiting compounds complicate the wetting characteristics of the substrate, and long term durability under moderate temperature conditions is the requirement for success.

Waterproofing of the silica-based and alumina-based insulation materials for space applications can be classified under two categories, permanent and expendable. Permanent refers to a surface modification or materials selection that would cause the TPS to be permanently waterproofed, without any extra treatment or procedure. Expendable refers to the category of waterproofing and re-waterproofing that results when the agent is burned off upon reentry into the atmosphere and requires a waterproofing treatment after every flight. The ideal expendable waterproofing material would leave little to no residual material on the insulation materials after each flight.

The solution chemistries evaluated during this research are intended for use on alumina-rich substrates and silica-rich substrates. The following are examples of such substrates:

SAFFIL. SAFFIL is a trademark of ICI Corporation. SAFFIL is a particular ceramic fiber insulation containing both alumina and silica. SAFFIL is a high temperature insulation made of such fibers; typical densities are 4, 5, 6, and 9 lbs. per cubic foot.

NEXTEL 440. NEXTEL is a trademark of 3M Company. NEXTEL is a family of ceramic fibers (312, 440, 610, 720) with different chemical compositions. The fibers are made into threads and into fabrics of various weaves. NEXTEL 440 is a high temperature thread and a flexible woven fabric made of alumina-silica fibers; the flexible woven fabric is used to cover the SAFFIL insulation in order to make high temperature TPS insulation blankets that will be used at locations on the exterior of the Space Shuttle Orbiter where the reentry temperature may be as high as 2200° F.

Alumina-Enhanced Thermal Barrier (AETB) tiles. AETB tiles are high temperature insulation tiles having an alumina-rich fibrous core and an outer ceramic coating. AETB tiles are used at locations on the exterior of the Space Shuttle Orbiter where the reentry temperature may be as high as 2600° F. AETB tiles have a central hole through the outer ceramic coating. The waterproofing solution is injected through this hole into the fibrous core.

Toughened Unipiece Fibrous Insulation/Alumina-Enhanced Thermal Barrier (TUFI/AETB) tiles. TUFI/AETB tiles are AETB tiles that have an improved outer ceramic coating.

Modifications in the solution chemistry based on the same waterproofing agents will provide effective waterproofing for other substrates, such as the silica-based insulation materials used for commercial airplane applications.

Research studies on neat (undiluted) samples of dimethyldiethoxysilane (DMDES), monomethyldiethoxysilane (MDES), and other candidate organosilanes on NEXTEL 440/SAFFIL insulation blankets show that the dimethyldiethoxysilane (DMDES) and monomethyldiethoxysilane (MDES) can produce the best waterproofing results. See Table 1 below. Dimethylethoxysilane (DMES) and methyltrimethoxysilane (MTMS) also provided some waterproofing efficiencies under these conditions.

TABLE 1

| Neat Organosilane Injected | Abbreviation | Amount (ml.) injected/sq. ft. of TPS | Water uptake wt. % |
|---|---|---|---|
| Tetraethoxysilane | TEOS | 3.0 | 177% |
| Tetramethoxysilane | TMOS | 3.0 | 216% |
| Methyltrimethoxysilane | MTMS | 3.0 | 51% |
| Dimethyldiethoxysilane | DMDES | 3.0 | 3.7% |
| Methyldiethoxysilane | MDES | 3.0 | 0.1% |
| Trimethylethoxysilane | TMES | 3.0 | 231% |
| Dimethylethoxysilane | DMES | 3.0 | 0.7–239% |
| Trifluoropropyltrimethoxysilane | TFTMS | 3.0 | 186% |

Further research shows that a waterproofing system consisting of a mixture of MDES and DMDES in a carrier solution of a 50/50 mixture of water and ethanol (by volume) provided the most effective waterproofing for NEXTEL 440/SAFFIL blanket insulation. The MDES was judged to be more effective at waterproofing the NEXTEL fabric surface, while the DMDES provided better protection upon penetration of water into the interior SAFFIL batting. This waterproofing system was also effective on Advanced Flexible Reusable Surface Insulation (AFRSI) blankets (wherein the insulation is made of silica fibers) and on AETB tiles. A spraying process is most effective for these systems. Having a water component in the solution improves process operability and decreases toxicity, contamination, environmental, and flammability concerns. Process parameters will be based on the specific vehicle operability requirements.

The agents tested are all monomers with relatively low molecular weights. This is necessary to limit the weight gain upon application of the coating and extend the life cycle of the blanket panel over the course of numerous re-waterproofing cycles. Monomeric waterproofing agents should also be less sensitive to the type of contamination seen on commercial airplanes. Oligomeric and polymeric waterproofing agents tend to be bound at only one or two sites on the polymeric chain. This can make the long chain subject to conformational changes upon contact with a surfactant or other contaminant. The greatest long-term hydrolytic stability will be realized with a short chain or monomeric molecule.

In order to distribute the waterproofing agent over large surface areas in a brief time period, a solvent or extender has to be used. This solvent would also have to be environmentally, safely, and health acceptable.

Environmental regulations are defining and controlling the manufacture and operation of vehicles in the aerospace business. These include the federal requirements, such as the National Emissions Standards for Hazardous Air Pollutants (NESHAPs) and the Control Technology Guidelines (CTG) which define business in the aerospace sector. These regulations impose restrictions on the types and quantities of materials used in the manufacture and rework of aerospace vehicles, outline requirements for some facilities used for processing, and affect record keeping and chemical management.

To minimize environmental and safety concerns, our ultimate goal is to design a system that is water-based, yet could still effectively render a system waterproof within the defined operational constraints. We started our efforts in this area by proving the feasibility of application of the waterproofing agents in a low concentration coating, namely 2% by volume. Ethanol is traditionally a good solvent for solubilizing functionalized metal alkoxides, such as organosilanes. We then conducted research using a 50/50% mixture of ethanol and water. This suppresses the flash point of the solution, making it more acceptable to use from a flammability standpoint. We also conducted 100% water solution mixture research. Under certain conditions, we could get all of the different solutions to work. The key is to match the maintenance and operability requirements with the appropriate waterproofing solution formulation to come up with the best combination of materials for a specific application.

The drawing illustrates the water uptake (wt. %) results in a NEXTEL 440/SAFFIL flexible blanket TPS for two time periods: for 24 hours after injection of the waterproofing solution and for 120 hours after injection. The five different carrier (solvent) solutions shown in the drawing are as follows: (1) neat (undiluted) DMDES; (2) 2% by volume of DMDES and 98% by volume of an ethanol (EtOH) carrier solution; (3) 2% by volume of DMDES and 98% by volume of a 50/50 (by volume) ethanol/water carrier solution; (4) 2% by volume of DMDES and 98% by volume of an 80/20 (by volume) ethanol/water carrier solution; and (5) 2% by volume of DMDES and 98% by volume of a water carrier solution. The drawing shows that the 50/50 (by volume) ethanol/water mixture gave the best waterproofing and application performance under the conditions tested in this study.

Thus, we have developed and demonstrated efficient, low toxicity waterproofing and re-waterproofing processes for NEXTEL 440/SAFFIL flexible blanket TPS. We have also developed three different waterproofing solutions that can be optimized to specific vehicle operability requirements. Table 2, below, summarizes the data for waterproofing of TPS with methyldiethoxysilane (MDES) or dimethyldiethoxysilane (DMDES), both of which having demonstrated promising waterproofing and re-waterproofing capabilities. The goal for waterproofing efficiency is less than 5% (<5% by wt.) water uptake.

TABLE 2

Waterproofing Of NEXTEL 440/SAFFIL Insulation Blankets With Methyldiethoxysilane (MDES) Or Dimethyldiethoxysilane (DMDES)

| | Neat MDES or DMDES (Concentrated) | 2% by volume of MDES or DMDES in 98% by volume Of Ethanol | 2% by volume of MDES or DMDES in 98% by volume of Water |
|---|---|---|---|
| Effectiveness (water uptake, wt. %) | <5% | <5% | <5% |
| Application Time | Medium | Medium–Short | Short |
| Residence Time to Reach Full Effectiveness | Short | Short | Medium |
| Amount of Organosilane Used Per Square Ft. of TPS | 18 ml | <2 ml | <2 ml |
| Toxicity | Moderate | Moderate–Low | Low |
| Flammable? | Yes | Yes | No |
| Environmental Compliance | Engineering Controls Required | Engineering Controls Required | No Regulation Necessary |
| Bagging Necessary? | Yes | Maybe | No |
| Best Mode of Application | Spray or Vapor | Spray or Infusion | Spray or Infusion |
| Chemical Compatibility of Solution With Vehicle (e.g., with other components of Space Shuttle Orbiter) | Poor | Good | Better |

In the production of fiberglass insulation for blankets for use in commercial airplane applications, the production process includes the melt spinning of the glass fiber followed by the immediate application of a phenolic-based lofting agent and the simultaneous application of the waterproofing agent. In this situation, the phenolic-based lofting agent and the organosilane waterproofing agent are inherently incompatible. The phenolic agent is deposited first, and coats the surface of the glass fibers and does not allow for full condensation of the organosilane waterproofing agent onto the glass fibers. Thus, the long-term durability of the system and the ability to operate in contaminated environments is compromised. Since the organosilane waterproofing agent is not completely bound to the glass fibers, it will not provide the waterproofing activity necessary. If a room temperature vulcanizing silicone rubber lofting agent were used instead of the phenolic agent, some compatibility with the waterproofing agent may be realized. Additionally, this silicone rubber type of loft control agent may also provide some waterproofing properties. It is possible to work out a compatible co-deposition sequence using appropriate chemistries to dramatically improve waterproofing properties in fiberglass insulation for blankets for use in commercial airplane applications.

The alkoxysilanes which may be used in this process are defined by the following formula:

$R_{4-x}\text{-Si-(O-R')}_x$,

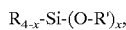

where x is 1–3 and where R is selected from the group consisting of alkyl groups having from 1C to 10C, hydrogen, or fluorocarbon groups having from 1F to 15F; and where O-R' is an alkoxy group having from 1C to 5C.

The carrier solvent or solvent mixture which is used in this process is selected from the group consisting of an aliphatic alcohol having from 1C to 6C, water, or mixtures thereof.

The concentration of the alkoxysilane used in this process may range from about 0.05% by volume to about 20% by volume. The corresponding concentration of the carrier may range from about 99.95% by volume to about 80% by volume.

The contact time of the waterproofing solution may be from about 10 minutes to 24 hours.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process of waterproofing alumina-rich or silica-rich fibrous thermal insulation, said process comprising the steps of:
   (a) providing an alumina-rich or silica-rich fibrous thermal insulation material;
   (b) providing a waterproofing solution consisting of:
      (1) a carrier solvent selected from the group consisting of aliphatic alcohols having 1C to 6C, water and mixtures thereof;
      (2) a dialkoxysilane selected from the group consisting of methyldiethoxysilane, dimethyldiethoxysilane and mixtures thereof; and optionally
      (3) a modifier selected from the group consisting of acetic acid, nitric acid, ammonium hydroxide, $RNH_2$, $R_2NH$, $R_3N$ and MOH, where R is selected from the group consisting of an alkyl group having 1C to 10C and hydrogen and where M is Na, Li or K;
   (c) contacting the fibrous material with the waterproofing solution for a sufficient amount of time to waterproof the fibrous material: and
   (d) curing the coated fibrous material to render it sufficiently waterproof.

2. The process of claim 1 wherein said waterproofing solution comprises a carrier solvent and methyldiethoxysilane.

3. The process of claim 1 wherein said waterproofing solution comprises a carrier solvent and dimethyldiethoxysilane.

4. The process of claim 1 wherein said waterproofing solution comprises a mixture of dimethyldiethoxysilane and methyldiethoxysilane in a mixture of water and ethanol.

5. The process of claim 1 wherein the chemical concentration of said alkoxysilane in the waterproofing solution is from about 0.05% to 20% by volume and the corresponding concentration of the carrier is from about 99.95% to about 80% by volume.

6. The process of claim 1 wherein the contact time of said waterproofing solution is from about 10 minutes to 24 hours.

7. A chemical solution for waterproofing alumina-rich or silica-rich fibrous thermal insulation, said solution consisting of:
   (a) a carrier solvent selected from the group consisting of aliphatic alcohols having 1C to 6C, water and mixtures thereof;
   (b) a dialkoxysilane selected from the group consisting of methyldiethoxysilane, dimethyldiethoxysilane and mixtures thereof; and optionally (c) a modifier selected from the group consisting of acetic acid, nitric acid, ammonium hydroxide, $RNH_2$, $R_2NH$, $R_3N$ and MOH, where R is selected from the group consisting of an alkyl group having 1C to 10C and hydrogen and where M is Na, Li or K.

8. The chemical solution of claim 7 wherein said waterproofing solution comprises a carrier solvent or solvent mixture and methyldiethoxysilane.

9. The chemical solution of claim 7 wherein said waterproofing solution comprises a carrier solvent or solvent mixture and dimethyldiethoxysilane.

10. The chemical solution of claim 7 wherein said waterproofing solution comprises a carrier solvent or solvent mixture and dimethyldiethoxysilane and methyldiethoxysilane.

11. The chemical solution of claim 7 wherein the chemical concentration of said alkoxysilane in the waterproofing solution is from about 0.05% to 20% by volume and the corresponding concentration of the carrier is from about 99.95% to about 80% by volume.

* * * * *